United States Patent
Ponnuswamy

(10) Patent No.: US 9,439,064 B2
(45) Date of Patent: Sep. 6, 2016

(54) METHODS FOR GROUP MANAGEMENT, SCHEDULING, AND RATE SELECTION FOR MU-MIMO USING USER LOCATION AND OTHER SYSTEM PARAMETERS

(71) Applicant: Aruba Networks, Inc., Sunnyvale, CA (US)

(72) Inventor: Subburajan Ponnuswamy, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 29 days.

(21) Appl. No.: 14/445,755

(22) Filed: Jul. 29, 2014

(65) Prior Publication Data

US 2016/0037330 A1    Feb. 4, 2016

(51) Int. Cl.
*G01R 31/08*   (2006.01)
*H04W 8/18*   (2009.01)
*H04B 7/04*   (2006.01)
*H04W 24/08*   (2009.01)

(52) U.S. Cl.
CPC .......... *H04W 8/186* (2013.01); *H04B 7/0452* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2008/0159205 A1* | 7/2008 | Sekiya | .................. | H04L 1/1867 370/328 |
| 2010/0227613 A1* | 9/2010 | Kim | .................. | H04L 25/03828 455/434 |
| 2010/0309848 A1* | 12/2010 | Erceg | .................... | H04L 5/0023 370/328 |
| 2011/0002219 A1* | 1/2011 | Kim | ..................... | H04B 7/0417 370/203 |
| 2012/0224481 A1* | 9/2012 | Babiarz | ............... | H04L 43/0876 370/230.1 |
| 2013/0070741 A1* | 3/2013 | Li | ....................... | H04W 72/046 370/338 |
| 2013/0107916 A1* | 5/2013 | Liu | ...................... | H04B 7/0452 375/219 |
| 2013/0286955 A1* | 10/2013 | Morinaga | ......... | H04W 72/1226 370/329 |
| 2013/0301551 A1* | 11/2013 | Ghosh | ................. | H04W 72/042 370/329 |
| 2013/0315139 A1* | 11/2013 | Abraham | ............. | H04B 7/0452 370/328 |
| 2014/0269964 A1* | 9/2014 | Du | ....................... | H04B 7/0452 375/267 |

* cited by examiner

*Primary Examiner* — Gregory Sefcheck
*Assistant Examiner* — Jael Ulysse

(57) ABSTRACT

Disclosed herein, one embodiment of the disclosure is directed to a system, apparatus, and method for grouping client devices for simultaneous MU-MIMO transmissions. When client devices are being grouped for simultaneous MU-MIMO transmissions, a first wireless network device may obtain information corresponding to a plurality of client devices that are associated with the first wireless network device. This information may correspond to signals received from one or more of the client devices by each of the wireless network devices other than the first wireless network device. Then, a subset of the client devices may be selected for concurrent communications based, at least in part, on the information corresponding to the plurality of client devices for concurrent communication. Thereafter, the subset of client devices, referred to as the first group, may be concurrently communicated with.

21 Claims, 7 Drawing Sheets

US 9,439,064 B2

METHODS FOR GROUP MANAGEMENT, SCHEDULING, AND RATE SELECTION FOR MU-MIMO USING USER LOCATION AND OTHER SYSTEM PARAMETERS

FIELD

Embodiment of the disclosure relate to wireless digital networks, and in particular, to a system and method for grouping client devices within wireless network devices.

BACKGROUND

The IEEE 802.11ac standard specifies the downlink multi-user multiple-input-multiple-output (DL-MU-MIMO) technique. One of the first steps in utilizing DL-MU-MIMO is to form groups of client devices (also called users, stations, etc.), where a group consists of at least two client devices that can receive spatial streams transmitted by a wireless network device simultaneously. A client device may belong to more than one group.

Groups need to be formed in such a way that interference between spatial streams for each client device within the same group is low enough to successfully deliver the simultaneously transmitted very high throughput (VHT) aggregated MAC protocol data units (A-MPDUs). At the same time, the scheduling of MU-MIMO burst needs to be done in such a way that the medium is used fairly.

According to the standard, the length of the frames (e.g., airtime) to all client devices within the same MU-MIMO burst has to be the same. When the frames have different airtime, padding is used to make sure that the MU-MIMO MPDU for all client devices are aligned to the same physical layer (PHY) symbol boundaries.

BRIEF DESCRIPTION OF THE DRAWINGS

The disclosure may best be understood by referring to the following description and accompanying drawings that are used to illustrate embodiments of the disclosure by way of example and not limitation. In the drawings, in which like reference numerals indicate similar elements.

DETAILED DESCRIPTION

Figure 1:
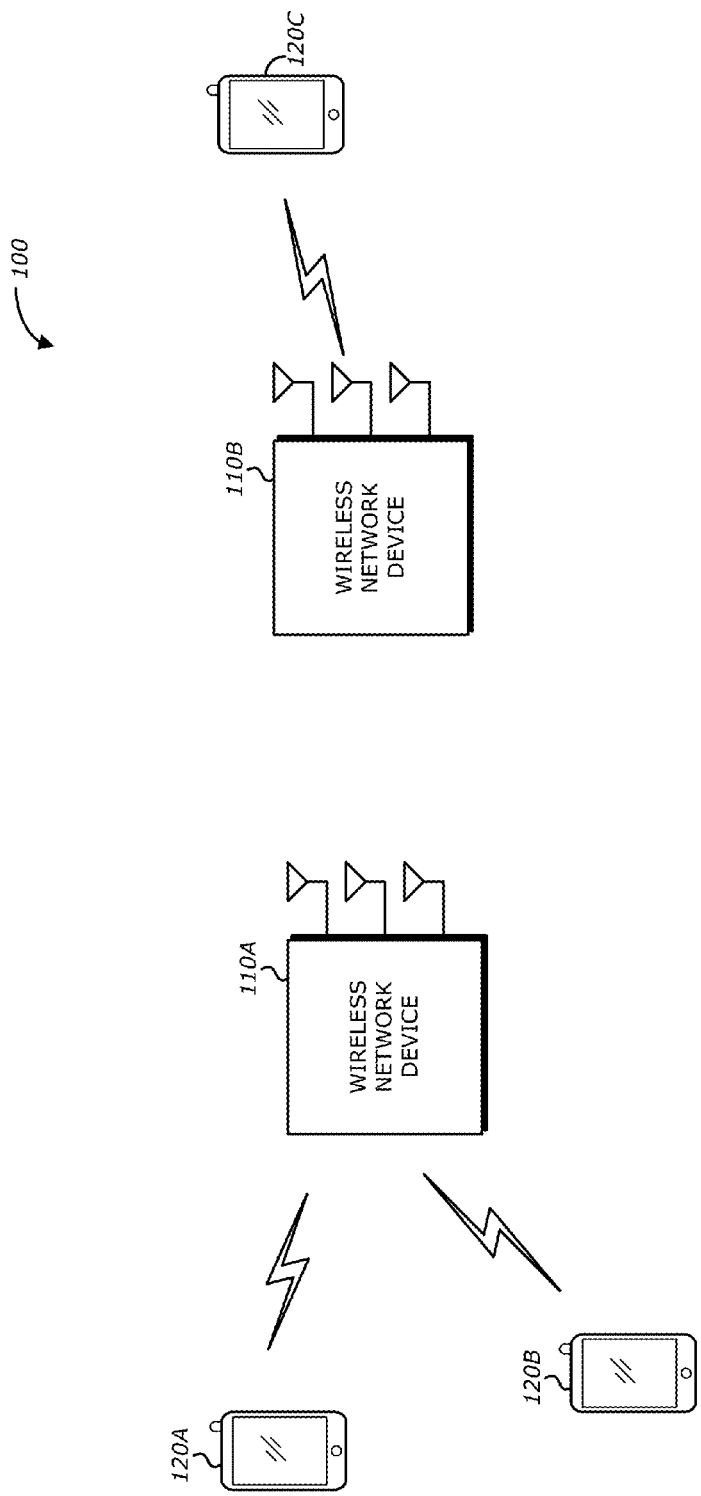
FIG. 1 illustrates an exemplary environment in which embodiments of the disclosure may be practiced.

In the following description, numerous specific details are set forth. However, it is understood that embodiments of the disclosure may be practiced without these specific details. In other instances, well-known circuits, structures and techniques have not been shown in detail in order not to obscure the understanding of this description.

Disclosed herein, one embodiment of the disclosure is directed to a system, apparatus, and method for grouping client devices for simultaneous MU-MIMO transmissions. When client devices are being grouped for simultaneous MU-MIMO transmissions, a first wireless network device may obtain information corresponding to a plurality of client devices that are associated with the first wireless network device. This information may correspond to signals received from one or more of the client devices by each of the wireless network devices other than the first wireless network device. Then, a subset of the client devices may be selected for concurrent communications based, at least in part, on the information corresponding to the plurality of client devices for concurrent communication. Thereafter, the subset of client devices, referred to as the first group, may be concurrently communicated with.

Disclosed herein, another embodiment of the disclosure is directed to a system, apparatus, and method for grouping client devices for simultaneous MU-MIMO transmissions. When client devices are being grouped for simultaneous MU-MIMO transmissions, a first wireless network device may obtain characteristics corresponding to a plurality of client devices associated with the first wireless network device. Then, a particular subset of client devices may be selected as members of a first group for concurrent communications based, at least in part, on a determination that the particular subset of the client devices share one or more characteristics. Thereafter, client devices in the first group may be concurrently communicated with.

Disclosed herein, still another embodiment of the disclosure is directed to a system, apparatus, and method for grouping client devices for using a lower modulation and coding scheme (MCS) in a MU-MIMO transmission. When client devices are being grouped for a MU-MIMO transmission, a plurality of client devices associated with a particular wireless network device may be identified. A first subset of the plurality of client devices may be grouped into a first group for concurrent communications. Next, a respective MCS may be selected for each client device in the first subset of client devices such that transmissions to each client device in the first subset of client devices during a same MU-MIMO transmission takes approximately an equal airtime. Thereafter, data may be transmitted to each client device in the first subset of client devices such that respective airtime values for transmitting data to each client device in the first subset of client devices during the same MU-MIMO transmission are approximately equal.

Disclosed herein, yet another embodiment of the disclosure is directed to a system, apparatus, and method for achieving fairness among MU-MIMO groups. Fairness among MU-MIMO groups is achieved by identifying a plurality of client devices with a particular wireless network device. A first subset of the plurality of client devices may be grouped into a first group for concurrent communications. Additionally, a second subset of the plurality of client devices may be grouped into a second group of client devices for concurrent communications. Thereafter, one of the first group of client devices or the second group of client devices may be selected for a next concurrent communication based on an aggregated fairness value, where the aggregated fairness value may be computed using a fairness value for each of the client devices in the plurality of client devices.

Of course, other features and advantages of the disclosure will be apparent from the accompanying drawings and from the detailed description that follows below.

In the following description, certain terminology is used to describe features of the disclosure. For example, in certain situations, the term "logic" is representative of hardware, firmware and/or software that is configured to perform one or more functions. As hardware, logic may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage. When executed by one or more processors, executable code may cause the one or more processors to perform operations according to the executable code.

A "frame" is a series of bits having a prescribed format. Examples of a frame may be a typical frame format as well as other variations that include a header and a body portion (e.g. an Asynchronous Transfer Mode "ATM" cell). Also, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

FIG. 1 illustrates an exemplary environment 100 in which embodiments of the disclosure may be practiced. The exemplary wireless network devices 110 are MIMO-capable network device that provides data access service to one or more client devices 120 via wireless radio frequency (RF) transmissions. Wireless network devices 110 and client devices 120 may operate according to one or more versions of the IEEE 802.11 standards, such as the IEEE 802.11n and IEEE 802.11ac standards. Although two wireless network devices 110 and three client devices 120 are shown in FIG. 1, namely wireless network devices 110A-B and client devices 120 A-C, environment 100 may include additional wireless network devices 110 and/or client devices 120. These additional devices, however, are omitted from FIG. 1 in order not to obscure the disclosure. Moreover, the association statuses of wireless network devices 110 and client devices 120 shown in FIG. 1 are illustrative only, and do not limit the disclosure in any way.

Figure 2:
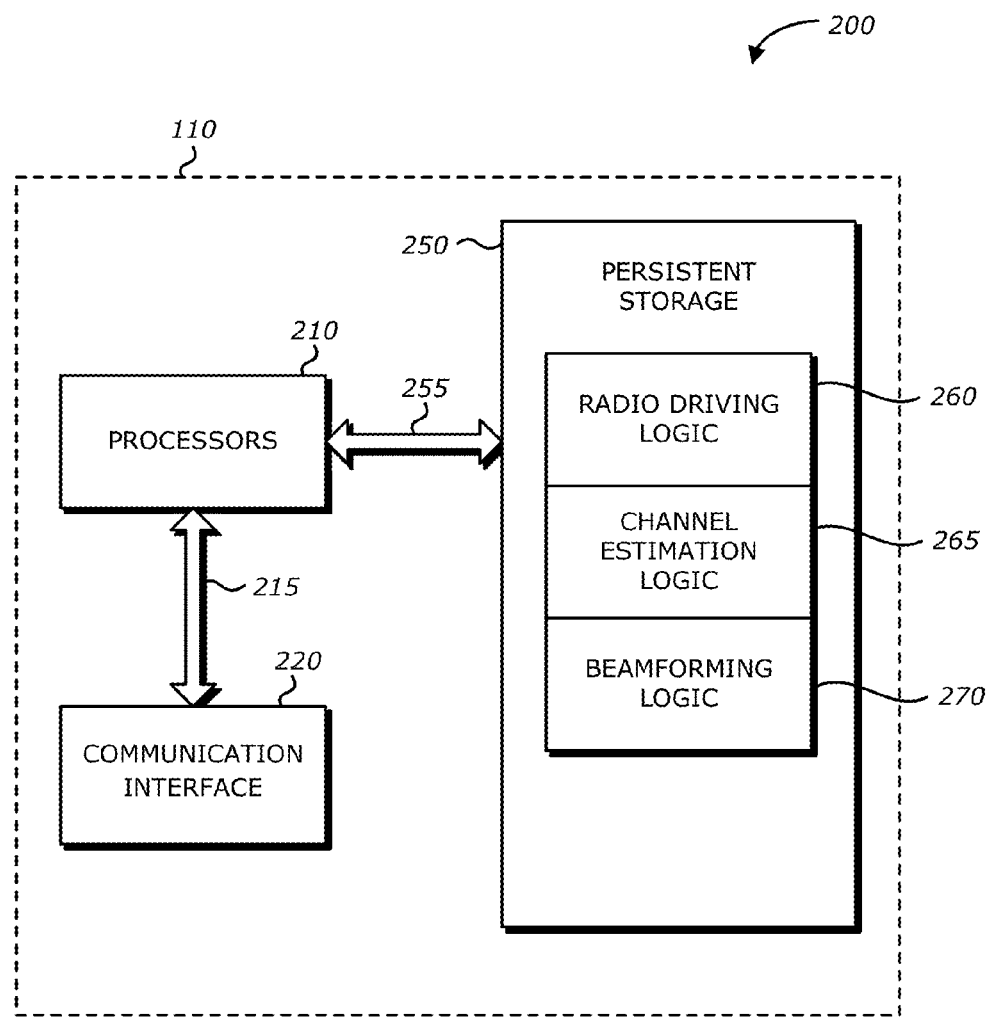
FIG. 2 is an exemplary block diagram of logic associated with a wireless network device.

Referring now to FIG. 2, an exemplary block diagram 200 of logic associated with wireless network device 110 is shown. The wireless network device 110 comprises one or more processors 210 that are coupled to communication interface logic 220 via a first transmission medium 215. Communication interface logic 220 enables communications with the data network (not shown), with client devices such as client devices 120 of FIG. 1, and possibly with an external controller (not shown). According to one embodiment of the disclosure, communication interface logic 220 may be implemented as one or more radio modules coupled to antennas for supporting wireless communications with other devices. Additionally, communication interface logic 220 may be implemented as a physical interface including one or more ports for wired connectors.

Processor 210 is further coupled to persistent storage 250 via transmission medium 255. According to one embodiment of the disclosure, persistent storage 250 may include radio driving logic 260, channel estimation logic 265, and/or beamforming logic 270 for the proper operation of wireless network device 110. Of course, when implemented as hardware, radio driving logic 260, channel estimation logic 265, and/or beamforming logic 270 would be implemented separately from persistent memory 250.

In some embodiments, the operation environment comprises a plurality of wireless network devices 110. System-wide knowledge collected through the plurality of wireless network devices 110 may be used in the grouping of client devices 120 for MU-MIMO transmissions. Such system-side knowledge may include, for example, locations of the client devices 120. Many known methods may be utilized to estimate the locations of the client devices 120 using information collected through the plurality of wireless network devices 110, as will be described below. For example, locations of the client devices 120 may be estimated in a distributed manner, or at the network controller, or with an external device which is communicatively coupled to the wireless network devices 110 and configured to estimate the locations of the client devices 120. Once estimations of the locations of the client devices 120 are obtained, distances between the client devices 120 may also be estimated. It should be appreciated that the locations of the client devices 120 and the distances between the client devices 120 can be a good indicator of the level of expected interference between spatial streams simultaneously transmitted to these client devices 120.

Therefore, in one embodiment, in order to reduce interference, client devices 120 may be grouped for MU-MIMO transmissions based, at least in part, on the locations of the client devices 120. Exactly how the client devices 120 are grouped based on their locations does not limit the disclosure. Factors such as the RF characteristics of the operation environment, as well as the actual MU-MIMO implementation including the algorithm used to implement multi-user beamforming, may need to be taken into consideration in determining how the client devices 120 should be grouped based on their locations.

As stated above, many known methods may be utilized to estimate the locations of the client devices 120 using information collected through the plurality of wireless network devices 110. For example, some commonly used methods utilize triangulation or other similar methods based on received signal strength indicator (RSSI) and/or signal-to-noise ratio (SNR) measurements. These methods may be further enhanced with information gathered from MU-MIMO frame exchange transmissions. The IEEE 802.11ac standard requires the wireless network device 110 to transmit null data packet (NDP) frames and requires the client devices 120 to generate compressed beamforming reports during the sounding process of MU-MIMO transmissions. The frequency of such exchanges can be high: the sounding-feedback process can be expected to repeat itself every 10s of milliseconds. Therefore, a listening wireless network device 110 may use the compressed beamforming reports for an accurate estimation of the distances and/or the locations of the client devices 120. It should be appreciated that using the compressed beamforming reports for distance and/or location estimation can be preferable to using probe requests because probe requests occur less frequently. In a conventional implementation, the sounding and feedback frames may be consumed at the physical layer. Therefore, adaptations may be needed to forward these frames to the media access control (MAC) layer and further on to higher layers where location and/or distance estimation takes place.

In some embodiments, location estimations may not be available for various reasons. For example, the application and location engine (ALE) or other software and/or hardware that performs location estimation may not be available. In these embodiments, each wireless network device 110 may maintain a list of RSSIs/SNRs for the client devices 120 it can hear regardless of the association statuses of the client devices 120, and the lists from all the wireless network devices 110 may be aggregated either through the mediation of a network controller or in a distributed manner. The RSSI's/SNR's may be measured with probe requests and/or the sounding-feedback process. The aggregated lists may be combined with information relating to the locations of the wireless network devices 110 and/or the distances between the wireless network devices 110 to estimate the distances between the client devices 120.

The locations of the wireless network devices 110 and/or the distances between the wireless network devices 110 may be ascertained in various ways. For example, each wireless network device 110 may be aware a priori of the relative locations of the other wireless network devices 110 through a building map or other similar means. In another embodiment, wireless network devices 110 may not be aware of the exact locations of the other wireless network devices 110, but they may estimate the distances between them from the information they may gather by listening to each other. Once estimations of the distances between the client devices 120 are obtained, client devices 120 may be grouped for simultaneous MU-MIMO transmissions based, at least in part, on the distances between the client devices 120 so that transmissions to the client devices 120 are less likely to interfere with each other. For example, client devices 120 that have the maximum RSSI/SNR on each neighboring wireless network device 110 may be placed in the same group, and client devices 120 that have the second highest RSSI/SNR on each neighboring wireless network device 110 may be placed in the same group, etc. Of course, exactly how client devices 120 are grouped based on the distances between the client devices 120 does not limit the disclosure.

Figure 3:
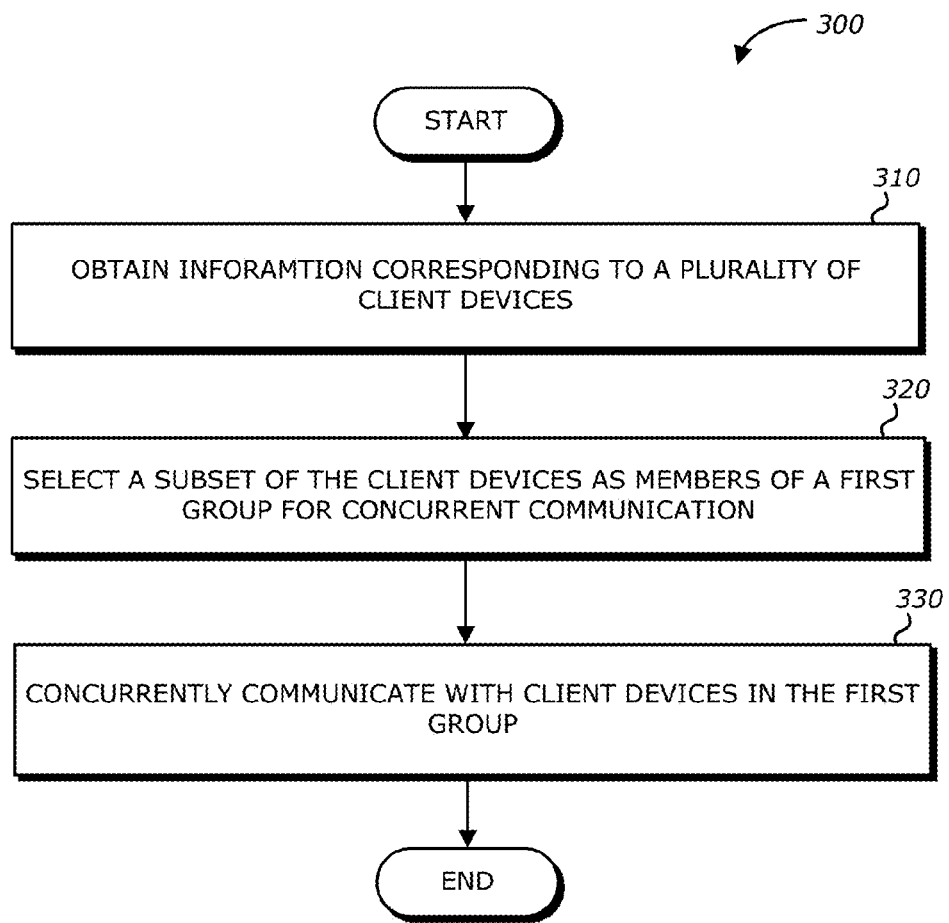
FIG. 3 is a flowchart illustrating an exemplary method for grouping client devices for simultaneous MU-MIMO transmissions.

Referring to FIG. 3, a flowchart illustrating an exemplary method 300 for grouping client devices 120 for simultaneous MU-MIMO transmissions is shown. At block 310, a first wireless network device 110 may obtain information corresponding to a plurality of client devices 120 associated with it, where the information may correspond to signals received from one or more of the client devices 120 by each of the wireless network devices 110 other than the first wireless network device 110. The wireless network devices 110 other than the first wireless network device 110 may be determined to be neighbors of the first wireless network device 110, as described above. Moreover, the information corresponding to the signals may comprise signal strength, RSSI, and/or SNR values. At block 320, a subset of the client devices 120 may be selected for concurrent communications based, at least in part, on the aforementioned information corresponding to the plurality of client device.

In one embodiment, the subset of client devices 120 may be selected as members of the first group based, at least in part, on a determination that the two or more of the subset of the clients devices are not detected by a same wireless network device 110. In a further embodiment, the subset of client devices 120 may be selected as members of the first group based, at least in part, on a determination that two or more of the subset of client devices 120 are not detected by a same wireless network device 110 with a signal strength above a threshold value. In yet another embodiment, the subset of client devices 120 may be selected as members of the first group based, at least in part, on a determination that two or more of the subset of client devices 120 are not detected by a same wireless network device 110 with a similar signal strength. In still another embodiment, the subset of client devices 120 may be selected as members of the first group based, at least in part, on a determination that each client device 120 in the subset of client devices 120 is located in a different direction from the first wireless network device 110. At block 330, the client devices 120 in the first group may be concurrently communicated with. The concurrent communication may be a simultaneous MU-MIMO transmission.

It is desirable in MU-MIMO scheduling to maximize the probability of success for each MU-MIMO A-MPDU. It is also desirable to maintain fairness across all client devices 120 and across classes of traffic. It should be appreciated that these may be competing goals. In order to maximize the probability of success, group membership should be determined so that inter-user interference within a group is minimized. On the other hand, fairness requires that client devices 120 be grouped and scheduled in such a way that all client devices 120 and all classes of traffic are serviced based on defined or pre-configured fairness criteria.

Two metrics have been contemplated to measure the probability of success and fairness, respectively. The success metric indicates the probability of success based on the level of interference between group members and historical success rate for the group, and a group fairness metric indicates combined fairness for the group. It should be noted that more than one group may have the same probability of success and/or fairness.

The success metric may be a value on a suitable scale. For example, it may be a percentage corresponding to the probability of success, or may be a number between 1 and 10, etc. When a group is formed, the initial success metric may be estimated based on the expected level of interference, which in turn may be estimated based on the locations of the client devices 120 and/or the RSSI/SNR measurements, as described above. The success metric may be continuously updated based on the actual success rate of VHT A-MPDUs for this group. The success metric may need updating because some of the location/RSSI/SNR information may be inaccurate. Most recent location/RSSI/SNR information may also be used to update the success metric. In some embodiments, when the success metric falls below a predetermined threshold, the group may be dissolved and new groups may be formed.

The group fairness metric indicates the fairness level for the group. It may be a value on a suitable scale. For example, it may be a number in the −N to +N range, where a positive value indicates a positive credit for the group (e.g., more A-MPDUs may be scheduled for this group) and a negative value indicates a negative credit (e.g., further A-MPDUs should not be scheduled for this group unless other groups have even lower credits). In one embodiment, scheduling A-MPDUs for groups based on fairness metrics may be based on a token bucket algorithm. The client devices 120's token bucket credits, either positive or negative, for an entire group may be aggregated, either by summing them up or using a weighted formula to achieve fairness within the group. In another embodiment, the fairness metric may also be maintained on a per-traffic class (e.g., access category) basis. In other words, each group may have more than one fairness metric. In a further embodiment, other metrics such as average airtime for groups may be used in scheduling A-MPDUs.

Figure 4:
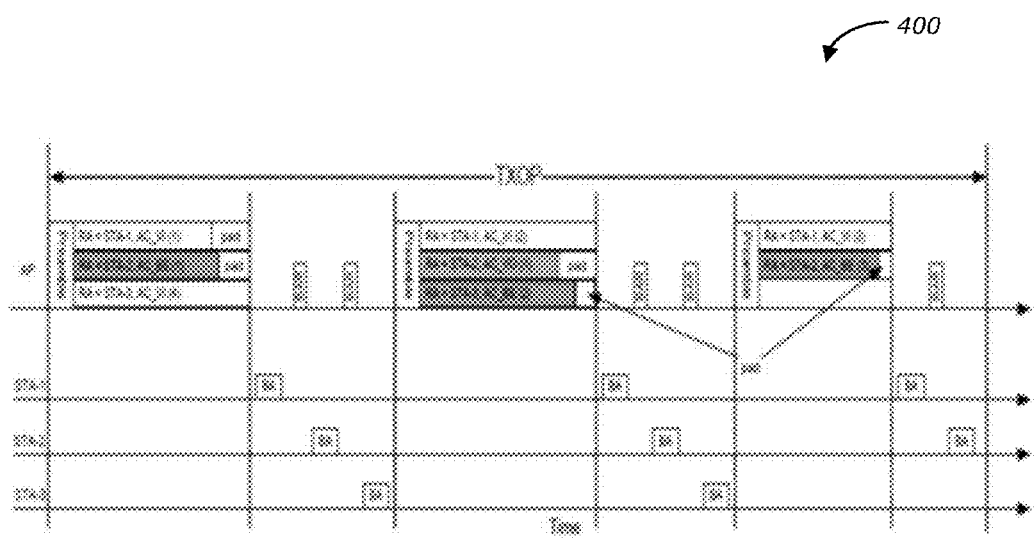
FIG. 4 is an exemplary illustration of padding in MU-MIMO transmissions.

Referring to FIG. 4, an exemplary illustration 400 of padding in MU-MIMO transmissions is shown. As can be seen in FIG. 4, for a particular MU-MIMO transmission, when members in a group have different average airtime values, padding may be required according to the IEEE 802.11ac standard. Instead of padding, it has been contemplated that lower modulation and coding schemes (MCSs) than would be selected by a conventional rate adaptation algorithm (e.g., previously determined MCSs) may be used within this particular MU-MIMO transmission for those client devices 120 that have a shorter airtime. Therefore, by using lower MCSs, reliability and robustness for the transmission to these client devices 120 may be improved during this transmission without increasing the overall A-MPDU size or affecting the overall fairness. It should be noted that the effects of the lower MCSs chosen here should not be accumulative. In other words, MCSs for future transmissions should be chosen independently from the particular lower MCSs used for this particular transmission. In one embodiment, a padding may be added to a transmission to a client device 120 that previously did not have any padding to align the transmissions to the whole group to the same PHY symbol boundaries.

Figure 5:
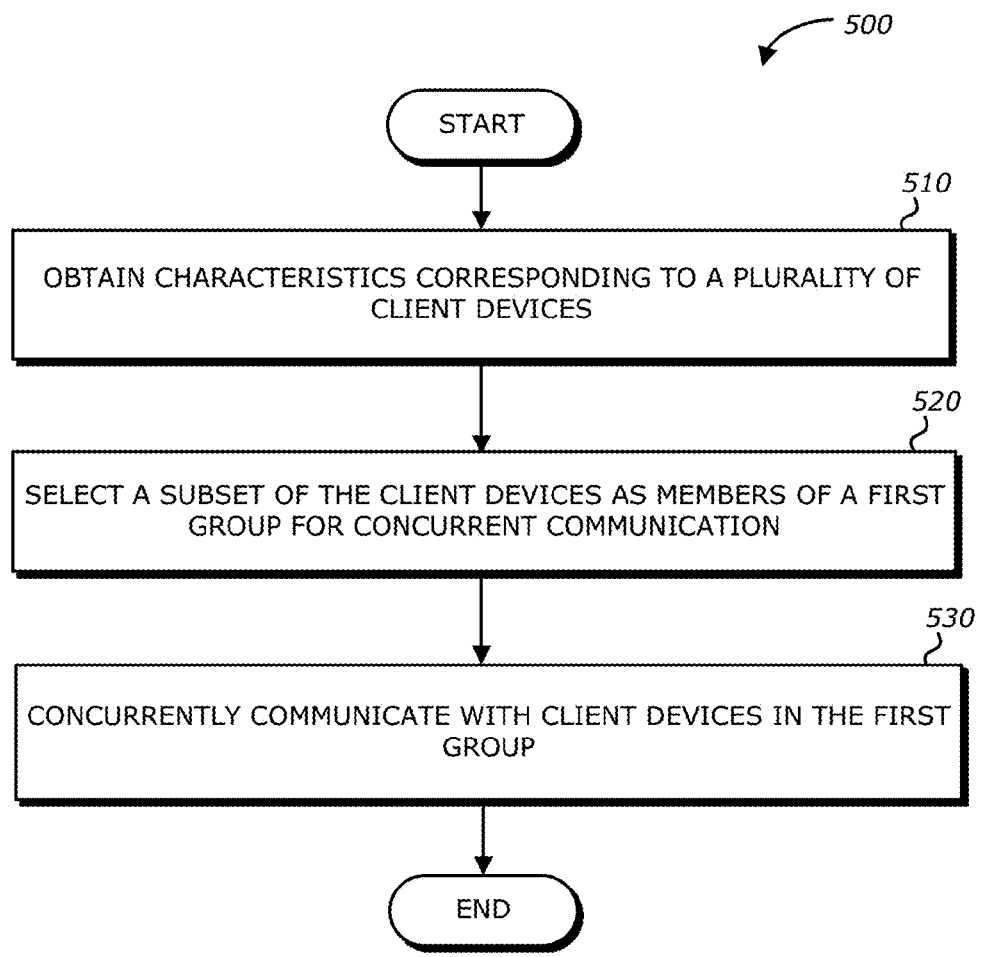
FIG. 5 is a flowchart illustrating an exemplary method for grouping client devices for simultaneous MU-MIMO transmissions.

Referring to FIG. 5, a flowchart illustrating an exemplary method 500 for grouping client devices 120 for simultaneous MU-MIMO transmissions is shown. At block 510, a first wireless network device 110 may obtain characteristics corresponding to a plurality of client devices 120 associated with the first wireless network device 110. The characteristics may be, for example, signal strength, RSSI, and/or SNR values. Next, at block 520, a particular subset of client devices 120 may be selected as members of a first group for concurrent communication based, at least in part, on a determination that the particular subset of the client devices 120 share one or more characteristics. In one embodiment, the determination that the particular subset of the client devices 120 share one or more characteristics may comprise a determination that a respective signal strength of signals received from each client device 120 in the particular subset of client devices 120 is in a similar range of values. In another embodiment, the determination that the particular subset of the client devices 120 share one or more characteristics may comprise a determination that a respective amount of airtime needed for transmitting respective data to each client device 120 in the particular subset of client devices 120 is in a similar range of values. It should be appreciated that even when the respective amount of airtime needed for transmitting respective data to each client device 120 is in a similar range of values, the amount of data transmitted to each client device 120 may be different: for example, one client device 120 may be transmitting live voice data, and another client device 120 may be transmitting live video data. It should further be appreciated that the respective amount of airtime needed for transmitting data to a client device 120 may be based on statistical data such as an average amount of time over a time period, a median amount of time over time periods, and/or a mode amount of time over time periods. Thereafter, at block 530, client devices 120 in the first group may be concurrently communicated with. The concurrent communication may be a simultaneous MU-MIMO transmission.

Figure 6:
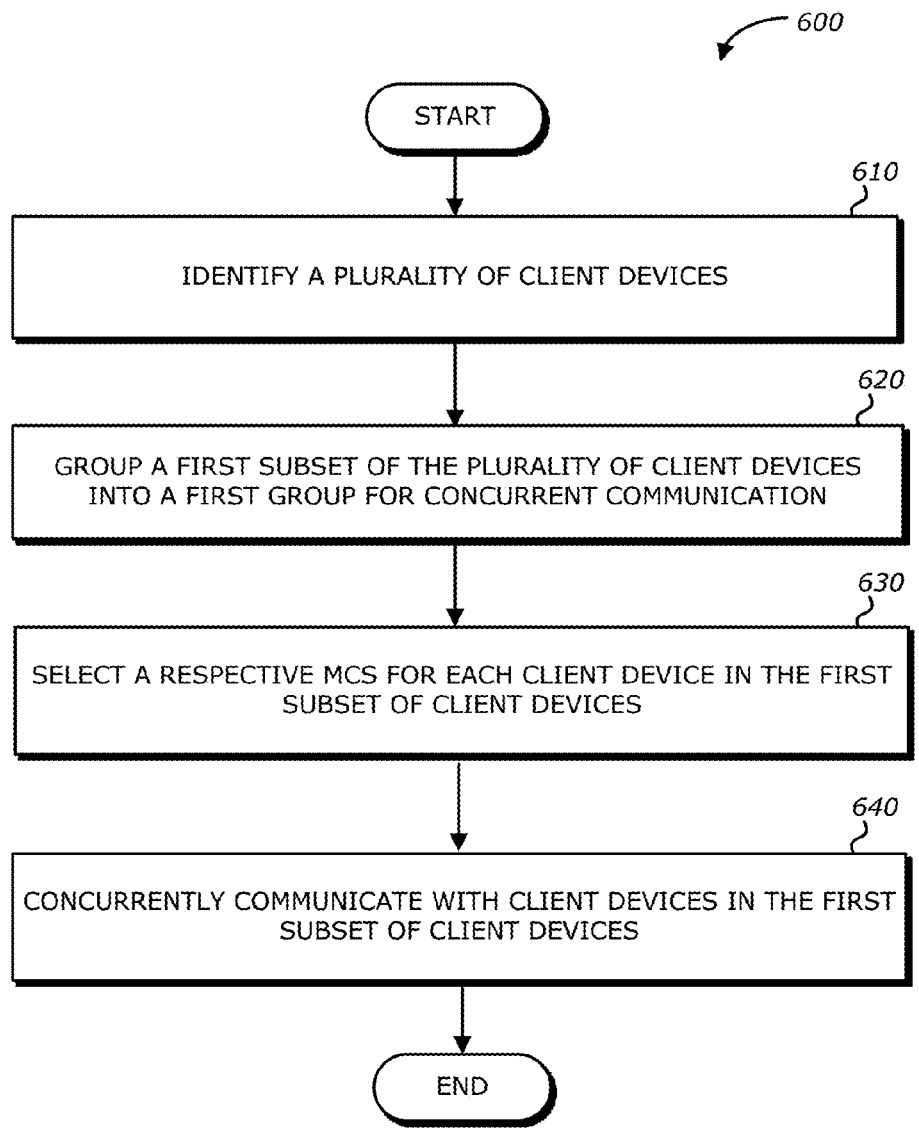
FIG. 6 is a flowchart illustrating an exemplary method for using a lower modulation and coding scheme (MCS) in a MU-MIMO transmission.

Referring to FIG. 6, a flowchart illustrating an exemplary method 600 for using a lower MCS in a MU-MIMO transmission is shown. At block 610, a plurality of client devices 120 associated with a particular wireless network device 110 may be identified. At block 620, a first subset of the plurality of client devices 120 may be grouped into a first group for concurrent communication. Next, at block 630, a respective MCS may be selected for each client device 120 in the first subset of client devices 120 such that transmission to each client device 120 in the first subset of client devices 120 during a same MU-MIMO transmission takes approximately an equal airtime. In one embodiment, selecting the respective MCS may comprise modifying an initial MCS value previously determined for a client device 120 based on characteristics of the client device 120. At block 640, data may be transmitted to each client device 120 in the first subset of client devices 120 such that respective airtime values for transmitting data to each client device 120 in the first subset of client devices 120 during the same MU-MIMO transmission are approximately equal.

Figure 7:
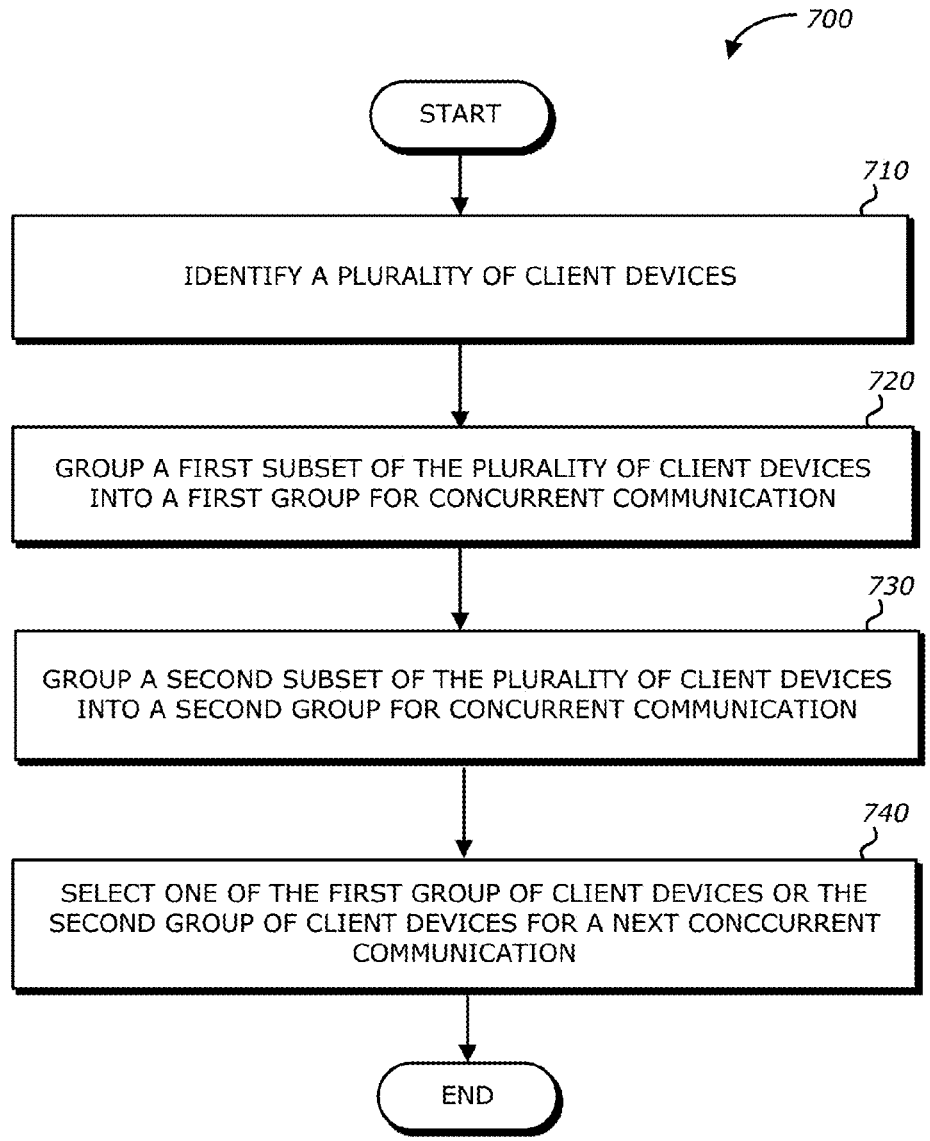
FIG. 7 is a flowchart illustrating an exemplary method for achieving fairness among MU-MIMO groups.

Referring to FIG. 7, a flowchart illustrating an exemplary method 700 for achieving fairness among MU-MIMO groups is shown. At block 710, a plurality of client devices 120 may be identified with a particular wireless network device 110. Next, at block 720, a first subset of the plurality of client devices 120 may be grouped into a first group for concurrent communication. At block 730, a second subset of the plurality of client devices 120 may be grouped into a second group for concurrent communication. At block 740, one of the first group of client devices 120 or the second group of client devices 120 may be selected for a next concurrent communication based on an aggregated fairness value, where the aggregated fairness value may be computed using a fairness value for each of the client devices 120 in the plurality of client devices 120. In one embodiment, the fairness value for any particular client device 120 is based on airtime used for communication with the client device 120. In another embodiment, the fairness value for any particular client device 120 is based on the amount of data exchanged with the client device 120. It should be noted that in some embodiments, a particular client device 120 may be a member of both the first group of client devices 120 and the second group of client devices 120, while in some other embodiments, the first group of client devices 120 and the second group of client devices 120 are mutually exclusive.

Therefore, by utilizing methods described herein, client devices 120 may be placed into groups for simultaneous MU-MIMO communications in such a way that reduces inter-user interference within the groups and maintains fairness between groups at the same time.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. A non-transitory computer readable-medium comprising instructions which, when executed by one or more hardware processors of a first wireless network device, cause performance of operations comprising:
    obtaining, by the first wireless network device, information corresponding to a plurality of client devices associated with the first wireless network device, wherein the information corresponds to signals received from one or more of the plurality of client devices by each of a plurality of wireless network devices other than the first wireless network device, and wherein the information comprises at least an airtime fairness value for transmitting data to each of the one or more of the plurality of client devices during each of a plurality of multi-user multiple input multiple output (MU-MIMO) transmissions;
    calculating an aggregated airtime fairness value for each of the one or more of the plurality of client device based at least on the information corresponding to the plurality of client devices;
    selecting a subset of the plurality of client devices as members of a first group for concurrent communication such that the aggregated airtime fairness value for transmitting data to each client device in the subset of the plurality of client devices during a plurality of multi-user multiple input multiple output (MU-MIMO) transmissions are approximately equal; and
    concurrently communicating with the subset of the plurality of client devices in the first group.

2. The non-transitory computer-readable medium of claim 1, wherein selecting the subset of the plurality of client devices as members of the first group is responsive at least to determining that two or more of the subset of the plurality of client devices are not detected by a same wireless network device in the plurality of wireless network devices.

3. The non-transitory computer-readable medium of claim 1, wherein selecting the subset of the plurality of client devices as members of the first group is responsive at least to determining that two or more of the subset of the plurality of client devices are not detected, with a signal strength above a threshold value, by a same wireless network device in the plurality of wireless network devices.

4. The non-transitory computer-readable medium of claim 1, wherein selecting the subset of the plurality of client devices as members of the first group is responsive at least to determining that two or more of the subset of the plurality of client devices are not detected, with a similar signal strength, by a same wireless network device in the plurality of wireless network devices.

5. The non-transitory computer-readable medium of claim 1, wherein selecting the subset of the plurality of client devices is responsive to determining that each client device in the subset of the plurality of client devices is located in a different direction from the first wireless network device.

6. The non-transitory computer-readable medium of claim 1, wherein the plurality of wireless network devices are determined to be neighbors of the first wireless network device.

7. The non-transitory computer-readable medium of claim 1, wherein the operations further comprise:
    determining that the subset of the plurality of client devices share one or more characteristics.

8. The non-transitory computer-readable medium of claim 7, wherein determining that the subset of the plurality of client devices share the one or more characteristics comprises determining that a respective signal strength of signals received from each client device in the particular subset of client devices is in a similar range of values.

9. The non-transitory computer-readable medium of claim 7, wherein determining that the subset of the plurality of client devices share the one or more characteristics comprises determining that a respective amount of airtime needed for transmitting respective data to each client device in the particular subset of client devices is in a similar range of values.

10. The non-transitory computer-readable medium of claim 9, wherein an amount of data transmitted to each client device is different.

11. The non-transitory computer-readable medium of claim 9, wherein the respective amount of airtime needed for transmitting data to a client device is based on statistical data, the statistical data comprising one or more of: an average amount of time over a time period, a median amount of time over time periods, and a mode amount of time over time periods.

12. The non-transitory computer-readable medium of claim 1, wherein the operations further comprise:
    for each client device in the first subset of client devices, selecting a respective Modulation and Coding Scheme (MCS) such that transmission to each client device in the first subset of client devices during a same MU-MIMO transmission takes approximately an equal airtime; and
    transmitting data to each client device in the first subset of client devices such that respective airtime values for transmitting data to each client device in the first subset of client devices during the same MU-MIMO transmission are approximately equal.

13. The non-transitory computer-readable medium of claim 12, wherein selecting the respective MCS comprises modifying an initial MCS value previously determined for a first client device of the first subset of client devices based on characteristics of the first client device.

14. The non-transitory computer-readable medium of claim 1, wherein the operations further comprise:
    grouping a second subset of the plurality of client devices into a second group for concurrent communication; and
    selecting one of the first group of client devices or the second group of client devices for a next concurrent communication based on an aggregated fairness value, the aggregated fairness value computed using a fairness value for each of the client devices in the plurality of client devices.

15. The non-transitory computer-readable medium of claim 14, wherein the fairness value for any particular client device in the plurality of client devices is based on airtime used for communication with the particular client device.

16. The non-transitory computer-readable medium of claim 14, wherein the fairness value for any particular client device in the plurality of client devices is based on an amount of data exchanged with the particular client device.

17. The non-transitory computer-readable medium of claim 14, wherein a particular client device is a member of both the first group of client devices and the second group of client devices.

18. The non-transitory computer-readable medium of claim 14, wherein the first group of client devices and the second group of client devices are mutually exclusive.

19. The non-transitory computer-readable medium of claim 1, wherein the aggregated airtime fairness value is calculated based on one or more of a success metric and a group fairness metric.

20. The non-transitory computer-readable medium of claim 19, wherein the success metric indicates a probability of success based on a level of interference between the subset of the plurality of client devices.

21. The non-transitory computer-readable medium of claim 19, wherein the group fairness metric combines a plurality of fairness levels corresponding to each of the subset of the plurality of client devices, and wherein a high fairness level indicates a high level of compliance with pre-defined fairness criteria when different client devices and different classes of traffic are serviced by the first wireless network device.

* * * * *